UNITED STATES PATENT OFFICE.

WALTER MAX WILHELM HORN, OF TEPLITZ, AUSTRIA, ASSIGNOR, BY MESNE ASSIGNMENTS, TO THE CHEMICAL FOUNDATION, INC., A CORPORATION OF DELAWARE.

CERAMIC ARTICLE AND METHOD OF MAKING SAME.

1,335,167. Specification of Letters Patent. Patented Mar. 30, 1920.

No Drawing. Application filed October 28, 1914. Serial No. 869,140.

*To all whom it may concern:*

Be it known that I, WALTER MAX WILHELM HORN, a subject of the King of Prussia, residing at Teplitz, Austria, have invented certain new and useful Improvements in Ceramic Articles and Methods of Making Same, of which the following is a specification.

The present invention relates to the use of fire-proof ceramic compositions for making radiators for steam and hot water heaters.

The properties necessary in ceramic radiators are: (1) especially great resistance to frequent changes in temperature, of course only at temperatures of from 20° to 120° at the most, (2), imperviousness to water, (3) high mechanical solidity, combined with (4) a certain elasticity, (5) exact shape, (6) agreeable appearance, (7) easily cleaned (8) surfaces capable of being glazed and (9) comparative cheapness.

Hitherto it has not been possible to make ceramic radiators, that have shown themselves permanently resistant to change of temperature and also durable in use. The ceramic radiators heretofore used lasted a few months, it is true, but then began to show small cracks, that gradually enlarged and spread through the entire body of the radiator, so that the radiator at last became useless.

In making up the composition to be used for making ceramic radiators, regard must be paid to that point first. Moreover the composition must be easy to mold. Since it is usual to place in the interior of ceramic radiators four or five narrow tubes and make corresponding ribs on the outer surface in order to obtain as large a radiating surface as possible, in the least possible amount of space. In the case of iron radiators, it is extremely difficult to produce such shapes, and accordingly the ceramic radiators produced as described in the present application possess material advantages, such as a saving of space. I also call attention to the fact that in working in accordance with this process, it is necessary that the composition should be easily molded, and should be of a sufficient degree of liquidity, to pour into the molds.

Very numerous experiments, to discover the most suitable composition gave as a result first, that not only dense ceramic compositions, stone ware and porcelain, but also porous ceramic compositions, such as ordinary clay compositions, ordinary earthen ware and stone ware are entirely useless for producing permanently durable ceramic radiators. It is true that such compositions exhibited for the manufacture of ceramic radiators at first very useful and agreeable properties, but failed in the main requirement, that the radiators made from them shall also remain permanently durable, since they went to pieces after a few months' use. Finally it was discovered that only compositions of the type of the so-called refractory clay compositions, such as are used for making chamotte tiles, muffles, retorts and the like, which must furnish resistance to the highest temperatures used in the industries, actually furnish ceramic radiators that are permanently durable.

It is in the first place a very surprising fact that for making objects that are used only within temperature limits of about 20° to 120°, compositions must be used, that are otherwise employed only for producing objects, that must resist the highest temperatures (1,500° C., and far beyond) but in addition to that comes the fact, that the remaining properties of the objects made of refractory composition, their unattractive appearance, the fact that they contain shreds interspersed with strongly marked uneven pores, their great perviousness to water, their rough unglazed surface and moreover the known property of the refractory, fire-resistant composition itself, of being moldable only under special circumstances and then only into simple bodies, must deter any expert from using such refractory compositions for making radiators. Still the inventor has established the fact, that the production of useful and permanently durable ceramic radiators is possible only in case of the use of compositions of the type of the so-called refractory clay compositions. These compositions however, in order to give the radiators made of them in addition to permanent durability also the other necessary properties, must be subjected to certain modifications. Firstly the material composition, secondly the mode of mechanical production of the composition and thirdly the method of burning must be altered as well as fourthly the objects must be capable of being glazed. But all these changes must not affect the fundamental requirement, that the composition shall be refractory, and sufficiently strong for the purpose.

The material composition of ordinary refractory clay compositions consists as a rule of fire clay impoverished (made lean) by the addition of pulverized chamotte, that has been made from articles or shreds of fire clay, in various sized grains, in order that the composition shall be capable of being worked and the objects made from it shall not warp or tear in drying and burning. The composition is made of these constituents, while it is moistened with water and intimately mixed for example in a pug-mill. The composition so obtained is mostly worked by molding or pressing, because compositions prepared according to the above principles liquefy only under peculiar circumstances and can then be made only into simple objects.

The production of the compositions for ceramic radiators according to my invention on the contrary, is effected as follows: In order to obtain fine, pure colored radiators, I use fire clays burning as clean colored as possible, if necessary elutriated and impoverish them (make them lean) by adding a chamotte of the same material. The chamotte is not used in various sizes of grain however, but only when pulverized to an even fineness. In the selection of raw materials care must be taken that they shall contain as little as possible of free quartz, but much clay material, and secondly as few impurities and admixture of pieces of stone and the like as possible, which might act as flux. Such substances as feldspar must be carefully avoided. The first requirement has its reason in this, that the ceramic radiators should be as finely porous as possible and that compositions containing much clay material after burning present objects with much finer pores, than compositions with much finer quartz do. The object of the second requirement is to avoid the occurrence of the phenomenon of melting in burning by reason of the presence of flux, (alkalis and alkali earth compounds in the materials used being especially to be avoided for this reason) whereby strains would be produced in the comparatively large radiators, and such substances as alkalis and salts, which might become dissolved out of the material constituting the sections of the radiators by the water in the radiators, during the use of the radiators, which action would be accelerated by the repeated heating and cooling which would gradually lead to the destruction of the radiators. In order to give the composition for ceramic radiators greater capacity for molding and to give the finished radiators a still finer color, greater solidity and fineness of pore, a part of the chamotte may be replaced by a lean elutriated kaolin (unbaked when mixed with other ingredients).

The proportion in which the crude materials, selected according to the above principles, are mixed is naturally not a definite one, but varies according to the physical properties of the fire clay and the kaolin. The following would be an example:—

50 parts by weight of fire clay.
30 parts by weight of chamotte.
20 parts by weight of lean kaolin.

The mechanical working of the composition for ceramic radiators has not only for its purpose (as with ordinary fire clay compositions) in intimate mixing of the raw materials, but is also to accomplish another result, viz the comminution and liquefaction of the composition. For this purpose the constituents of the composition are ground up with water in ball mills to a determined fineness whereby a mass which is easily molded, is obtained. The amount of water used in moistening the mixture of materials, will be more than is ordinarily used for moistening ordinary clay, for example with 100 parts by weight of the mixture of raw materials, as above described, I may use 19 parts of water, in order to produce a comparatively thin mixture, which will readily flow. This mass, when molded produces ceramic radiators, having all the desired properties, which likewise have a very fine even porosity. Special weight is laid on this fine and even porosity for the reason that objects made of ordinary fire clay compositions possess a far coarser and very uneven porosity, so that it is impossible to waterproof complicated objects by glazing, as the glazing always fails at certain spots in consequence of the coarse uneven pores or else is sucked in into the interior and so produces spots pervious to water. Fine and even pores are therefore absolutely necessary for ceramic radiators, because water has difficulty in penetrating the fine pores to begin with, but before all these fine and even pores can be completely and surely closed by suitable glazing so that the radiators can be made entirely water-tight, the burning of the molded ceramic radiators also differs in many particulars from the methods followed in burning ordinary ceramic objects, thus while the ordinary ceramic objects pass through only one burning operation, but one as high as possible, ceramic radiators, to attain a faultless glaze, must be burned twice and in fact according to the porcelain burning process they can be exposed first to a lower and then to a higher burning, or according to the stone-ware burning process first to the higher and then in the lower firing. The highest burning temperature will not be driven over "saggar cones" 9—11 (1280–1320° C.), so that it remains below the highest temperature used for the burning of ordinary refractory ceramic ware. The ceramic radiators, at the temperature given if the compositions contain sufficient clay substance, attain both a sufficient solidity and a fine porosity by this comparatively low burning temperature. Thus fusion practically does not occur in burning these compositions, of which the starting materials are selected by the principles described above. The unavoidable differences in temperature at different places in the furnace, whereby various parts of one and the same radiator, might become heated to different temperatures, nevertheless cannot exert any unfavorable action, since the capacity of the raw materials of the radiator compositions to react upon each other at the temperatures used is very small. In consequence of this the possibility of the production of internal strains in the comparatively large radiators, (whose dimensions are always considerable, in one direction and arise to heights of 1300 mm.) is substantially prevented. The hidden strains, which seem however to be present in all ceramic radiators made of other composition than those of the type of the fire-proof clay composition, are however probably the cause of the splitting observed in ceramic radiators after only a month's use. By the frequent heating and cooling of the previously known ceramic radiators during use, the hidden strains are probably released, there arise first small cracks, which gradually enlarge until they are present throughout the entire body of the heater and after a few months lead to the destruction of the radiator, on the contrary this phenomenon does not arise with ceramic radiators of composition herein described. Consequently they are permanently durable.

What I claim is:—

1. A refractory ceramic material, suitable for use in making heating elements of radiators, capable of sufficiently withstanding changes in temperature between 20 and 120° C., said material containing plastic fire-clay, pulverized chamotte and lean kaolin, said ceramic material being substantially free from fragments of quartz and feldspar and being substantially free from alkalis and alkaline earths.

2. A burnt ceramic material, in the form of a heating element of a radiator, said element being capable of sufficiently withstanding changes in temperature between 20 and 120° C., said element containing as its essential constituents, plastic fire-clay, pulverized chamotte and lean kaolin, said material being capable of withstanding frequent changes in temperature, being slightly pervious to water, being of high mechanical strength, and possessing a sufficient degree of elasticity, and being unalterable in shape, and being capable of being glazed.

3. A refractory ceramic element for heating radiators, composed of fire-clay, pulverized chamotte and lean kaolin.

4. A method of making ceramic articles which comprises intimately mixing and moistening a composition comprising fire-clay, pulverized chamotte and lean kaolin, with a relatively large amount of water, molding said composition, and thereafter burning the same, at a temperature not over 1320° C.

5. In the manufacture of ceramic articles, the step of firing a refractory ceramic article composed of fire-clay, pulverized chamotte and lean kaolin, at a temperature not over 1320° C.

6. In the manufacture of ceramic materials, the step of intimately mixing clays relatively free from quartz, feldspar, alkalis and alkaline earths, with pulverized burnt ceramic ware, to produce a mixture capable of giving a finely porous ceramic article, and thereafter molding said mixture into the form of hollow heating elements, burning the same and glazing the same.

In testimony whereof I affix my signature in presence of two witnesses.

WALTER MAX WILHELM HORN.

Witnesses:
CLARE SIMON,
ILSE R. GRUND.